(12) United States Patent
Naito et al.

(10) Patent No.: US 8,787,747 B1
(45) Date of Patent: Jul. 22, 2014

(54) IMAGE STABILIZER DEVICE, INTERCHANGEABLE LENS, AND CAMERA SYSTEM

(71) Applicant: Panasonic Corporation, Osaka (JP)

(72) Inventors: Yusuke Naito, Osaka (JP); Masamichi Ohara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/190,614

(22) Filed: Feb. 26, 2014

(30) Foreign Application Priority Data

| Mar. 22, 2013 | (JP) | 2013-059524 |
| Aug. 6, 2013 | (JP) | 2013-163022 |

(51) Int. Cl.
*G03B 17/00* (2006.01)

(52) U.S. Cl.
USPC .................................................... 396/55

(58) Field of Classification Search
USPC .................................................... 396/55
See application file for complete search history.

(56) References Cited

U.S. PATENT DOCUMENTS

| 5,231,445 A * | 7/1993 | Onuki et al. ............. 396/55 |
| 5,940,630 A * | 8/1999 | Washisu ................... 396/55 |
| 6,163,651 A | 12/2000 | Washisu et al. |
| 6,704,501 B1 * | 3/2004 | Washisu .................. 396/55 |
| 6,707,991 B2 * | 3/2004 | Mizumura ............... 396/55 |
| 7,675,546 B2 * | 3/2010 | Usui ..................... 348/208.5 |
| 8,237,803 B2 * | 8/2012 | Yumiki ................. 348/208.4 |
| 2002/0027599 A1 * | 3/2002 | Yamazaki ............... 348/208 |
| 2012/0242847 A1 * | 9/2012 | Narita ................. 348/208.1 |

FOREIGN PATENT DOCUMENTS

JP 07-218946 A 8/1995

* cited by examiner

*Primary Examiner* — William B Perkey
(74) *Attorney, Agent, or Firm* — Renner, Otto, Boisselle & Sklar, LLP (57) ABSTRACT

The disclosure herein aims to provide an image stabilizer device that generates a more appropriate shake signal. The image stabilizer device for a camera system in the present disclosure includes a detection unit that detects an angular speed of the camera system, and outputs a shake signal associated with the detected angular speed, an acquiring unit that acquires information indicating a set shutter speed, an adjusting unit that advances a phase of the shake signal to generate an adjusted signal, and outputs the adjusted signal, when the set shutter speed is faster than a predetermined speed, and a correction unit that corrects an influence on an output of the image stabilizer device due to the shake associated with the angular speed, based on the shake signal or the adjusted signal.

5 Claims, 10 Drawing Sheets

|  | SS (high-speed) | SS (low-speed) |
|---|---|---|
| Body shake | Large | Small |
| Shutter impact | Small | Large |

IMAGE STABILIZER DEVICE, INTERCHANGEABLE LENS, AND CAMERA SYSTEM

BACKGROUND OF THE INVENTION

1. Field of the Invention

The disclosure herein relates to an image stabilizer device, an interchangeable lens, and a camera system.

2. Description of the Related Art

Published Patent Application No. H07-218946 describes a camera shake detection device. The camera shake detection device described in the above publication prevents an erroneous detection of shake caused by a mechanical impact generated in a release operation of a camera.

SUMMARY OF THE INVENTION

The camera shake detection device described in the above publication does not sufficiently generate an appropriate shake signal.

The disclosure herein aims to provide an image stabilizer device that can realize an image stabilization with high precision by generating a more appropriate shake signal.

In order to solve the above-mentioned problem, the image stabilizer device for a camera system in the present disclosure includes a detection unit that detects an angular speed of the camera system, and outputs a shake signal associated with the detected angular speed, an acquiring unit that acquires information indicating a set shutter speed, an adjusting unit that advance a phase of the shake signal to generate an adjusted signal, and to output the adjusted signal, when the set shutter speed is faster than a predetermined speed, and a correction unit that corrects an influence on an output of the image stabilizer device due to the shake associated with the angular speed, based on the shake signal or the adjusted signal.

The interchangeable lens in the present disclosure is an interchangeable lens detachable from a camera body to which an interchangeable lens can be attached, the interchangeable lens including a gyro sensor that detects an angular speed of the interchangeable lens and outputs a shake signal associated with the detected angular speed; a lens mount that acquires information indicating a set shutter speed from the camera body; a filter that advances a phase of the shake signal to generate an adjusted signal, and outputs the adjusted signal, when the set shutter speed is faster than a predetermined speed; a correction lens movable in a plane perpendicular to an optical axis of the interchangeable lens; and a lens controller that corrects an influence on the output of the interchangeable lens due to the shake associated with the angular speed, based on the shake signal or the adjusted signal.

The camera system in the present disclosure includes a camera body to which an interchangeable lens can be attached, and an interchangeable lens detachable from the camera body, wherein the camera body includes a body mount that communicates with the interchangeable lens; a shutter including a frame having an opening, and a curtain held by the frame that moves in a direction of opening the opening and in a direction of closing the opening; and a setting unit that sets a shutter speed of the shutter, and the interchangeable lens includes: a lens mount that communicates with the camera body through the body mount, and acquires information indicating a shutter speed set to the camera body; a gyro sensor that detects an angular speed of the interchangeable lens, and outputs a shake signal associated with the detected angular speed; a filter that advances a phase of the shake signal to generate an adjusted signal, and outputs the adjusted signal, when the set shutter speed is faster than a predetermined speed; a correction lens movable in a plane perpendicular to an optical axis of the interchangeable lens; and a lens controller that corrects an influence on the output of the interchangeable lens due to the shake associated with the angular speed, based on the shake signal or the adjusted signal.

According to the configuration described above, the image stabilizer device that can generate a more appropriate shake signal, and that can realize an image stabilization with high precision can be provided.

DETAILED DESCRIPTION OF THE PREFERRED EMBODIMENTS

Embodiments is described below in detail with reference to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

First Embodiment

A camera system according to a first embodiment is described below with reference to the drawings.

1-1. Outline

Figure 1:
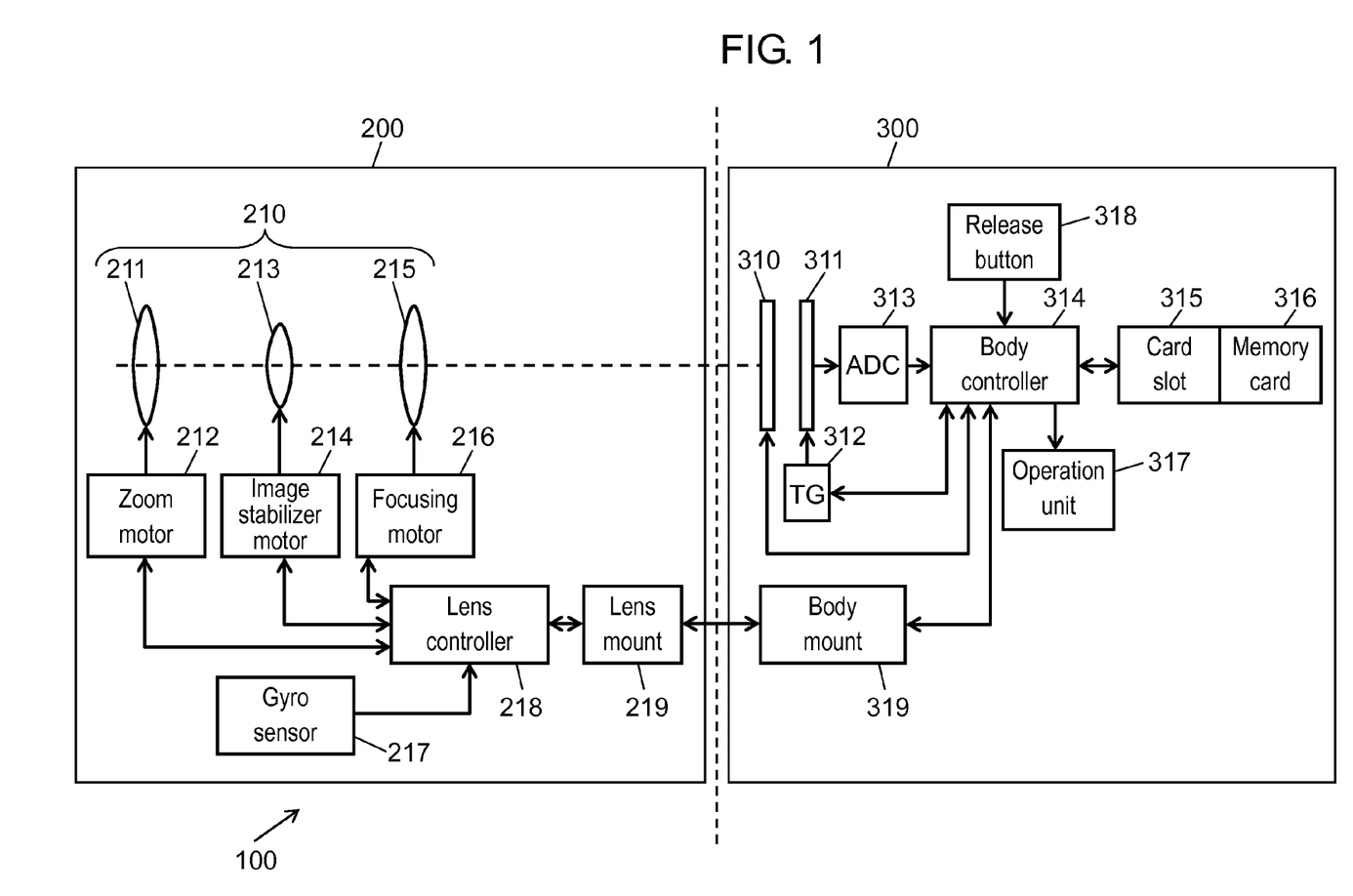
FIG. 1 is a block diagram illustrating an electric configuration of a camera system according to a first embodiment.

An outline of camera system 100 according to the present embodiment is described with reference to FIG. 1. FIG. 1 is a block diagram illustrating an electric configuration of camera system 100. Camera system 100 has an image stabilizing function. The image stabilizing function is to reduce an influence to an image captured by camera system 100 by vibration such as a user's hand shake. The vibration includes not only the user's hand shake but also a vibration caused by an operation of mechanical shutter 310 included in camera system 100. According to the present embodiment, camera system 100 takes into account the influence of the vibration on the captured image caused by the operation of the mechanical shutter 310.

The vibration caused by the operation of mechanical shutter 310 includes at least two types of vibrations. One of them is a vibration (hereinafter referred to as a body shake) caused by a rebound when mechanical shutter 310 starts its operation. The other one is a vibration (hereinafter referred to as a shutter impact) caused by a collision of a curtain, forming mechanical shutter 310, against an end of mechanical shutter 310 when mechanical shutter 310 finishes its operation. The degree by which these two types of vibrations influence the image captured by camera system 100 differs according to a shutter speed setting of camera system 100 as described below.

In view of this, interchangeable lens 200 according to the present embodiment includes gyro sensor 217, lens mount 219, lens controller 218, and image stabilizer motor 214. Gyro sensor 217 detects an angular speed, and outputs a shake signal associated with the detected angular speed. Lens mount 219 acquires information indicating a set shutter speed. Lens controller 218 adjusts the shake signal to generate a phase lead, and outputs the adjusted signal, when the set shutter speed is faster than a predetermined speed. A configuration including lens controller 218 and image stabilizer motor 214 corrects an influence given to the output of the camera system by the shake of the camera system besed upon the angular speed, based on the shake signal or the adjusted signal.

Thus, interchangeable lens 200 according to the present embodiment can generate a more appropriate shake signal.

1-2. Configuration of Camera System

A configuration of camera system 100 according to the present embodiment is described with reference to FIG. 1. Camera system 100 includes camera body 300, and interchangeable lens 200 detachable from camera body 300.

1-2-1. Configuration of Interchangeable Lens

Interchangeable lens 200 includes optical system 210, zoom motor 212, image stabilizer motor 214, focusing motor 216, gyro sensor 217, lens controller 218, and lens mount 219. Lens controller 218 included in interchangeable lens 200 generates a more appropriate shake signal based on the shake signal acquired from gyro sensor 217 and information acquired from camera body 300 via lens mount 219. Lens controller 218 controls image stabilizer motor 214, and drives image stabilizer lens 213 based on the generated more appropriate shake signal.

Optical system 210 includes zoom lens 211, image stabilizer lens 213, and focusing lens 215. Zoom lens 211 can move along an optical axis of optical system 210. Interchangeable lens 200 moves zoom lens 211 along the optical axis of optical system 210, thereby being capable of changing a focal length. Zoom motor 212 moves zoom lens 211 along the optical axis of optical system 210.

Image stabilizer lens 213 can move in a plane perpendicular to the optical axis of optical system 210. Interchangeable lens 200 moves image stabilizer lens 213 in the plane perpendicular to the optical axis of optical system 210, thereby being capable of changing an imaging position of a subject image. Interchangeable lens 200 can reduce an influence given to the image, captured by camera system 100, by the vibration such as the user's hand shake, by appropriately controlling the movement of image stabilizer lens 213. Image stabilizer motor 214 moves image stabilizer lens 213 in the plane perpendicular to the optical axis of optical system 210.

Focusing lens 215 can move along the optical axis of optical system 210. Interchangeable lens 200 can change the focusing state of the subject image by moving focusing lens 215 along the optical axis of optical system 210. Focusing motor 216 moves focusing lens 215 along the optical axis of optical system 210.

Gyro sensor 217 detects an angular speed, and outputs a shake signal associated with the detected angular speed. Since gyro sensor 217 is fixed inside, interchangeable lens 200 can detect an amount of vibration given to the camera system. A low-pass filter is incorporated in gyro sensor 217. Gyro sensor 217 converts an actual shake into the shake signal, and performs a low-pass filter process to the converted shake signal. Gyro sensor 217 outputs the shake signal, which has already undergone the low-pass filter process, to lens controller 218.

Lens controller 218 is a controller generally controlling entire interchangeable lens 200. Lens controller 218 can be realized by a microcomputer, for example. Lens controller 218 may be composed of a single semiconductor chip, or plural semiconductor chips. Lens controller 218 controls image stabilizer motor 214 to move image stabilizer lens 213 in a direction of canceling the vibration based on the shake signal acquired from gyro sensor 217 and the adjusted shake signal. With this control, the image stabilizing function of camera system 100 is realized.

Lens mount 219 is an interface that is mechanically and electrically connected to body mount 319 of camera body 300. Lens mount 219 transmits or receives a command and data to and from camera body 300 via body mount 319.

1-2-2. Configuration of Camera Body

Camera body 300 includes mechanical shutter 310, image sensor 311, timing generator 312, AD converter 313, body controller 314, card slot 315, memory card 316, operation unit 317, release button 318, and body mount 319. Camera body 300 allows image sensor 311 to execute an exposure operation during an exposure period adjusted by mechanical shutter 310 to generate image data, and records the generated image data onto memory card 316.

Mechanical shutter 310 transmits or blocks light incident on image sensor 311 during shooting, under the control from body controller 314. Mechanical shutter 310 is a focal plane shutter having a front curtain and a rear curtain. In other words, mechanical shutter 310 includes a frame having an opening, and the front curtain and the rear curtain, which are held by the frame, and move respectively in a direction of opening the opening and in a direction of closing the opening. Mechanical shutter 310 is controlled according to the shutter speed set to body controller 314. Mechanical shutter 310 is operated on a timing when release button 318 is fully depressed.

Image sensor 311 captures the subject image formed by interchangeable lens 200 to generate image data. Timing generator 312 transmits a synchronous signal to image sensor 311 in accordance with an instruction from body controller 314. The synchronous signal controls the timing of reading the image data from image sensor 311.

AD converter 313 converts the image data generated by image sensor 311 into digital signal from analog signal.

Body controller 314 is a controller generally controlling entire camera body 300. Body controller 314 can be realized by a microcomputer, for example. Body controller 314 may be composed of a single semiconductor chip, or plural semiconductor chips.

Card slot 315 is an interface to which memory card 316 is detachable. Card slot 315 transmits and receives data with memory card 316. Operation unit 317 includes a cross key, a depression button, a touch panel, and the like. Operation unit 317 is a collective term of a member used for performing various operations of camera system 100. Release button 318 is an operation member issuing a shooting instruction to body controller 314 by the user's depressing operation.

Body mount 319 is an interface that is mechanically and electrically connected to lens mount 219 of interchangeable lens 200. Body mount 319 transmits and receives a command and data with interchangeable lens 200 through lens mount 219.

1-2-3. Circuit Involved with Shake Detection in Lens Controller

Figure 2:
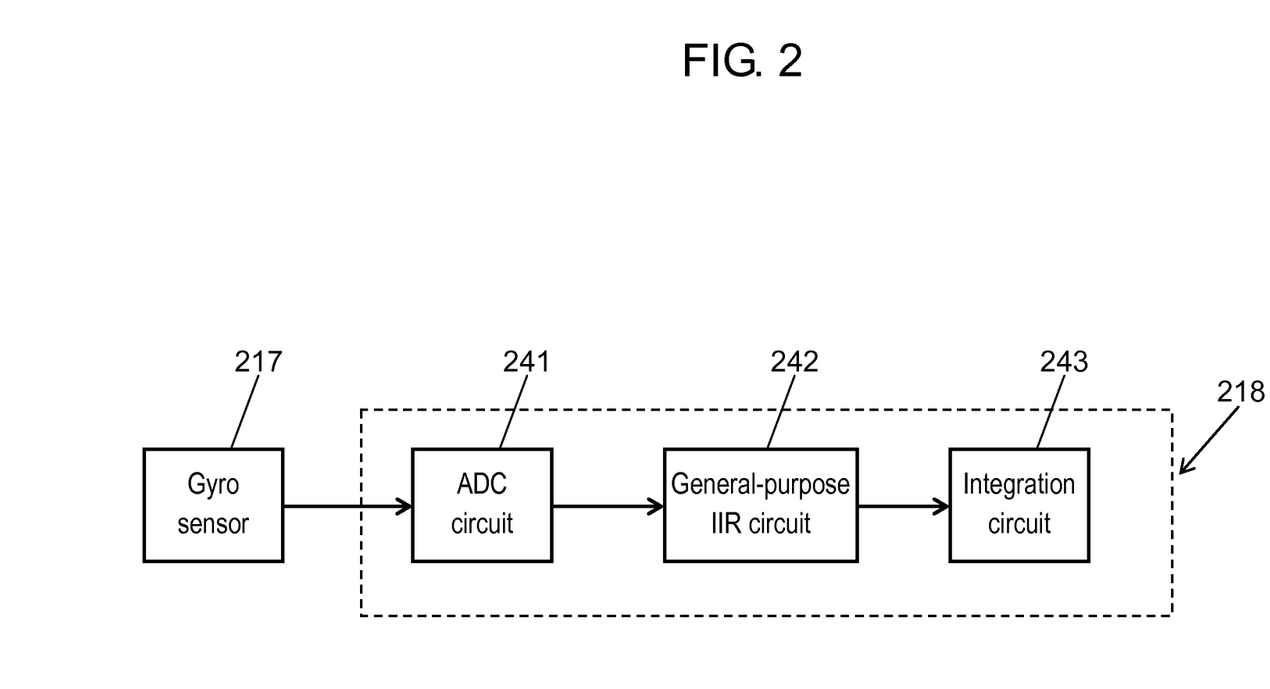
FIG. 2 is a block diagram illustrating a circuit structure involved with a shake detection in the first embodiment.

A circuit involved with a shake detection in lens controller 218 is described with reference to FIG. 2. FIG. 2 is a block diagram illustrating the circuit structure involved with the shake detection.

The circuit involved with the shake detection in lens controller 218 includes ADC circuit 241, general-purpose IIR circuit 242, and integration circuit 243. The circuit involved with the shake detection in lens controller 218 acquires the shake signal, which has undergone the low-pass filter process in gyro sensor 217, from gyro sensor 217. ADC circuit 241 performs AD (Analog Digital) conversion to the acquired shake signal, and outputs the AD-converted shake signal to general-purpose IIR circuit 242. General-purpose IIR circuit 242 performs various filter processes to the acquired shake signal, and outputs the resultant shake signal to integration circuit 243. The filter process in general-purpose IIR circuit 242 is described in detail below. Integration circuit 243 performs an integration process to the acquired shake signal.

Lens controller 218 controls image stabilizer motor 214 to move image stabilizer lens 213 based on the shake signal to which the integration process is performed. Thus, interchangeable lens 200 realizes the image stabilizing function.

1-3. Function of IIR Filter

Figure 3:
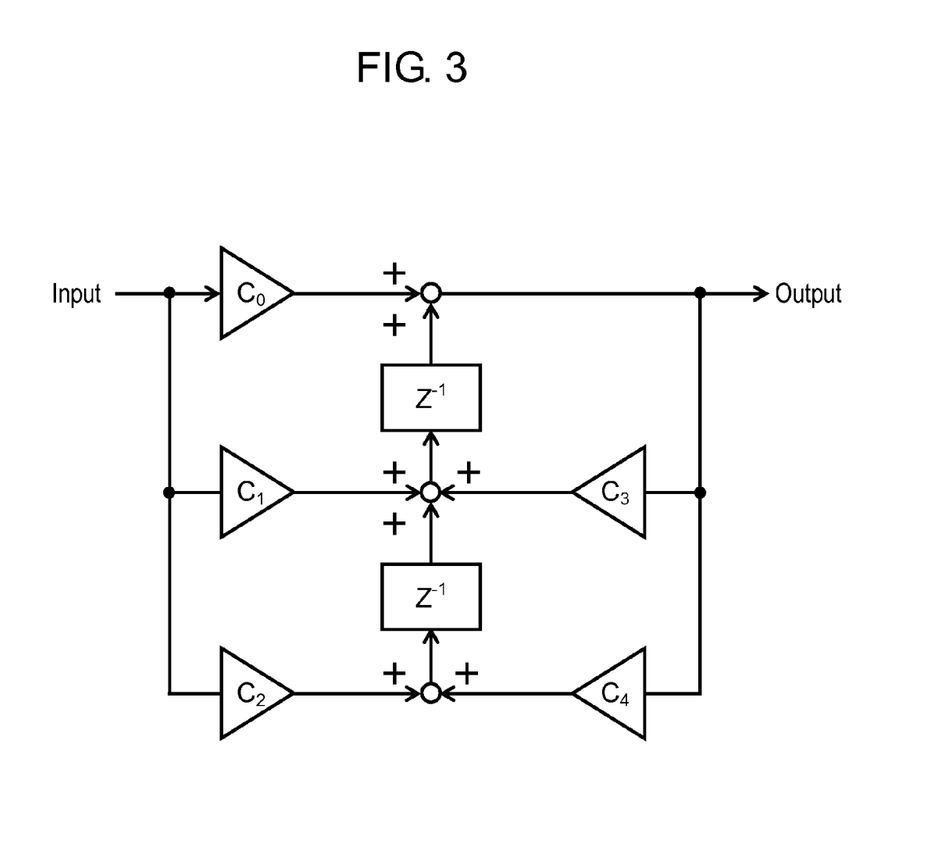
FIG. 3 is a block diagram illustrating a configuration of a general-purpose IIR according to the first embodiment.

Next, the detail of general-purpose IIR circuit 242 is described. General-purpose IIR circuit 242 is configured as illustrated in FIG. 3. FIG. 3 is a block diagram illustrating the configuration of general-purpose IIR circuit 242. General-purpose IIR circuit 242 functions as a lead-lag filter or low-pass filter by adjusting set values of C0, C1, C2, C3, and C4 illustrated in FIG. 3.

1-3-1. Lead-Lag Filter

Figure 4:
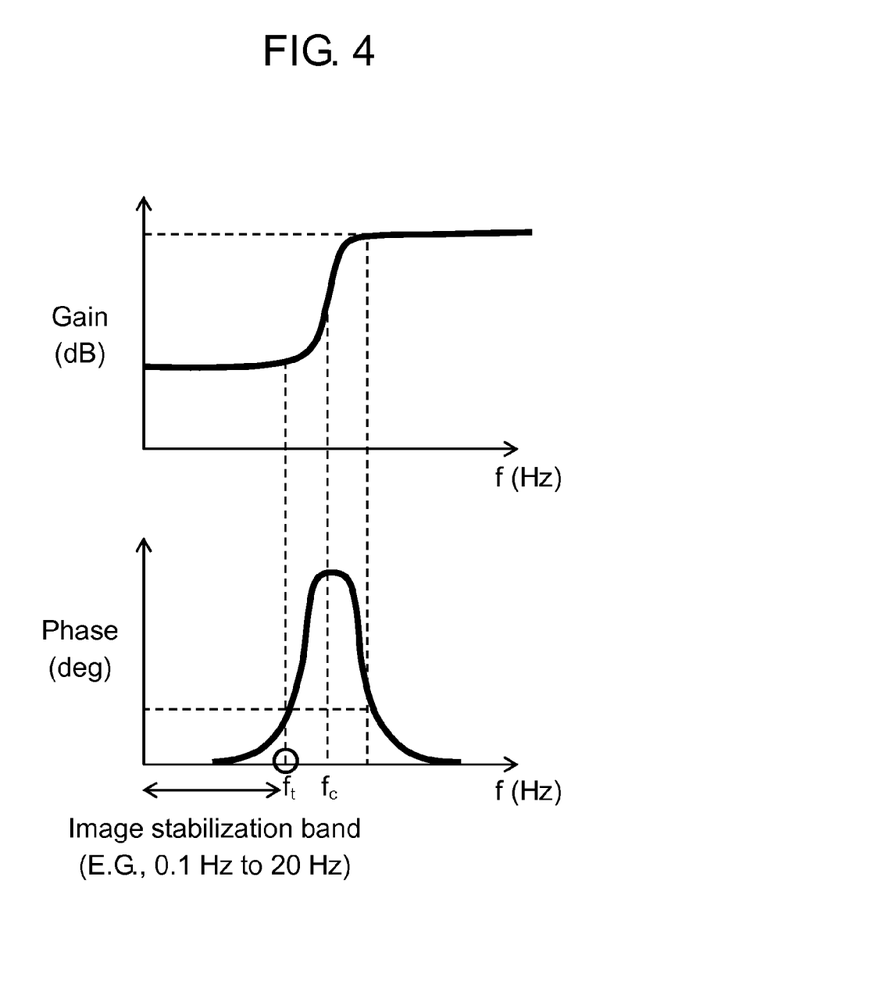
FIG. 4 is a characteristic view for describing a characteristic of a lead-lag filter according to the first embodiment.
Figure 5:
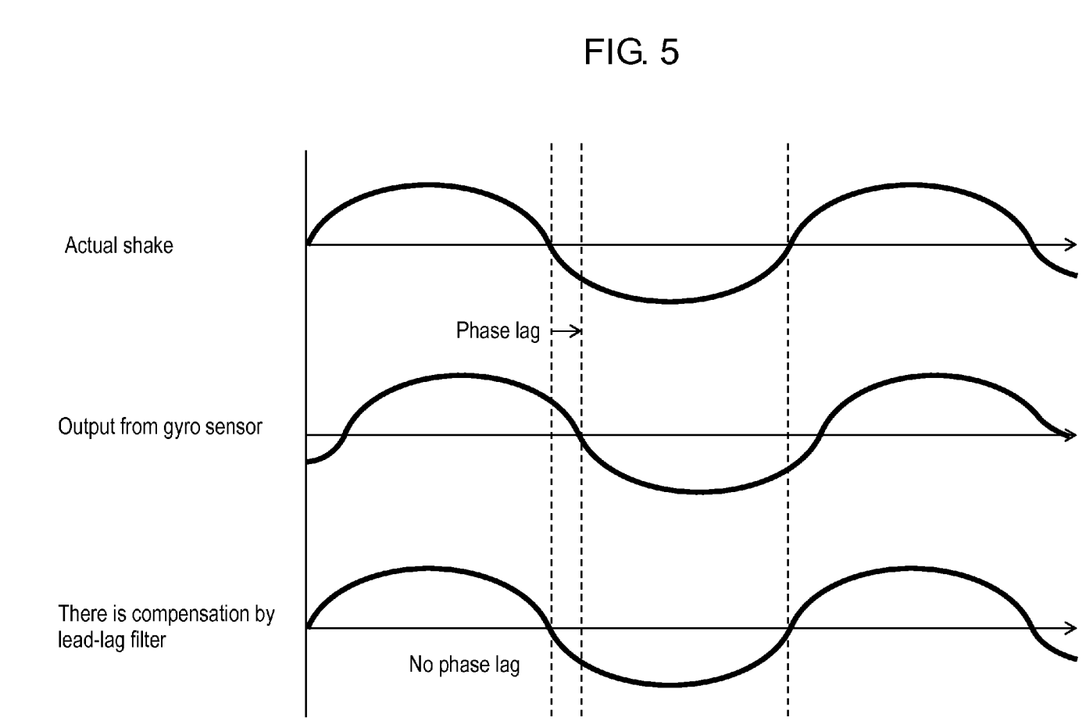
FIG. 5 is a schematic view for describing a function of the lead-lag filter according to the first embodiment.

A characteristic of general-purpose IIR circuit 242 serving as the lead-lag filter is firstly described with reference to FIGS. 4 and 5. FIG. 4 is a characteristic view for describing the characteristic of the lead-lag filter. FIG. 5 is a schematic view for describing the function of the lead-lag filter.

When general-purpose IIR circuit 242 functions as the lead-lag filter, it advances a phase of a signal having a frequency within a predetermined range about a specific frequency such as fc as illustrated in FIG. 4. For example, it is supposed that a vibration having a specific frequency ft is imparted to interchangeable lens 200 as an actual vibration, as illustrated by "actual vibration" in FIG. 5. In this case, gyro sensor 217 detects the actual vibration. Gyro sensor 217 performs the low-pass filter process to the actual vibration. When the frequency ft is higher than the predetermined frequency, gyro sensor 217 generates a phase lag to the actual vibration. In the example of "output of gyro sensor" in FIG. 5, gyro sensor 217 outputs a signal having 20 degrees phase lag.

If general-purpose IIR circuit 242 functions as the lead-lag filter, it advances 20 degrees phase to the wave with frequency ft. In this case, as illustrated in "there is compensation by lead-lag filter" in FIG. 5, general-purpose IIR circuit 242 advances 20 degrees phase for the signal having 20 degrees phase lag by gyro sensor 217. Specifically, general-purpose IIR circuit 242 compensates for the phase lag.

1-3-2. Low-Pass Filter

Next, the case where general-purpose IIR circuit 242 is used as a low-pass filter is described. The low-pass filter is a filter through which an attenuation amount of a frequency component higher than a predetermined cutoff frequency becomes larger than an attenuation amount of a frequency component lower than the predetermined cutoff frequency. Interchangeable lens 200 can attenuate the component having a frequency higher than the predetermined cutoff frequency, out of the outputs from gyro sensor 217, by using general-purpose IIR circuit 242 as the low-pass filter.

For example, when general-purpose IIR circuit 242 is used as the low-pass filter, it can significantly reduce the shake signal of 50 (Hz) or higher.

1-4. Vibration Caused by Shutter Operation

As described above, the vibration caused by the operation of mechanical shutter 310 includes at least two types of vibrations. One of them is a body shake. The other is a shutter impact.

1-4-1. Body Shake

Figure 6:
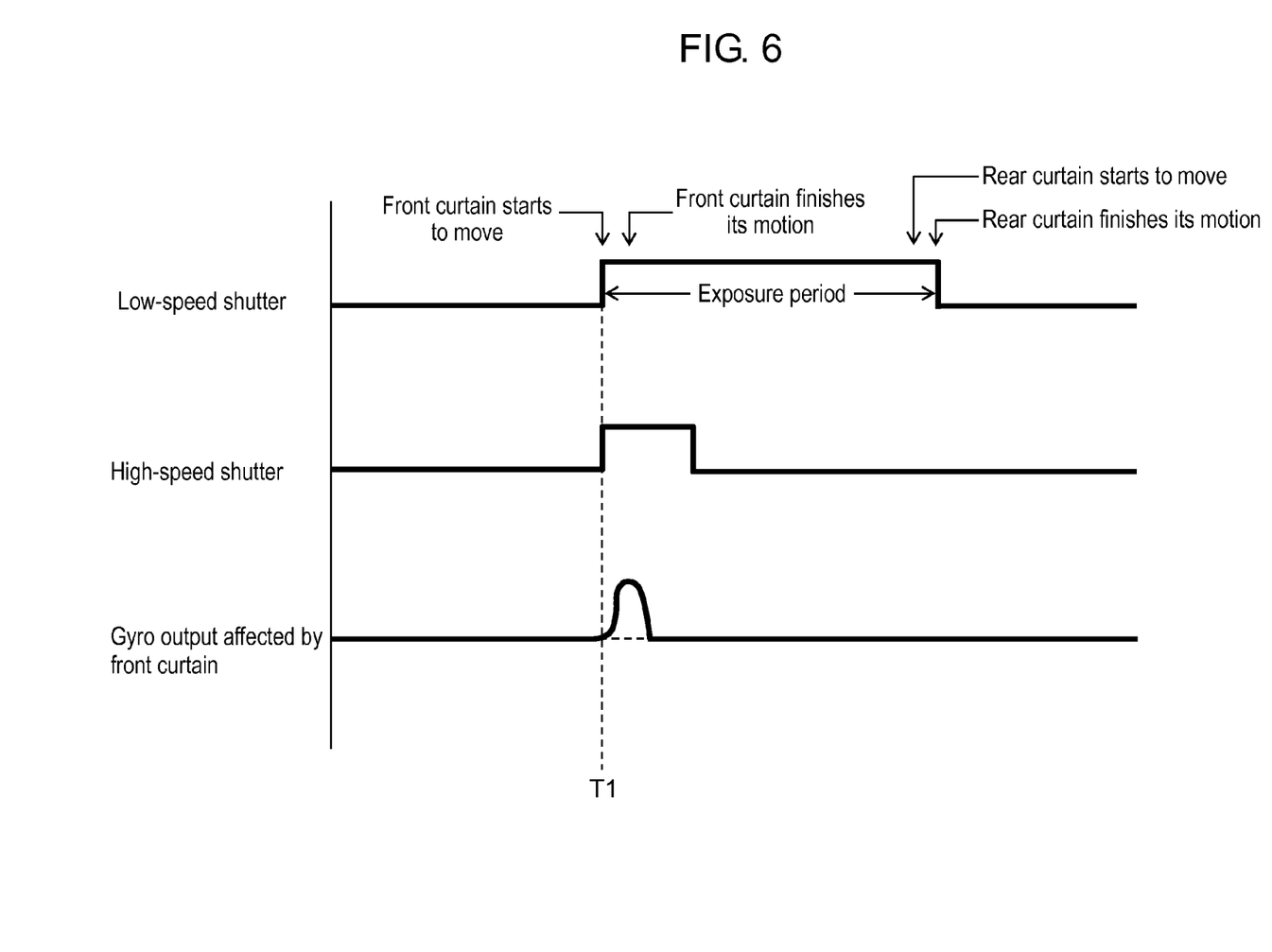
FIG. 6 is a schematic view for describing an influence to be given on a captured image by a body shake according to the first embodiment.

The body shake is described with reference to FIG. 6. FIG. 6 is a schematic view for describing an influence given to a captured image by the body shake.

When the user fully depresses release button 318, the operation of the front curtain of mechanical shutter 310 is started. When the front curtain starts to move, the body shake is generated by the rebound of this motion. The body shake is a vibration that affects the output from gyro sensor 217 and shakes camera system 100 to affect the captured image. For example, when the front curtain starts to move on time T1, the output from gyro sensor 217 is affected as indicated by "gyro output affected by front curtain" in FIG. 6. FIG. 6 does not illustrate the component such as the user's hand shake, but only illustrates the influence given by body shake to the output from gyro sensor 217.

The influence caused by the body shake to the captured image is described. When the shutter speed of camera system 100 is set as low, the body shake affects the output from gyro sensor 217 in a period with relatively low ratio to the exposure period of image sensor 311, as indicated by "low-speed shutter" in FIG. 6. On the other hand, when the shutter speed of camera system 100 is set as high, the body shake affects the output from gyro sensor 217 in a period with relatively high ratio to the exposure period of image sensor 311, as indicated by "high-speed shutter" in FIG. 6. Specifically, the body shake does not affect the captured image so much, when the shutter speed of camera system 100 is low, while it affects much more the captured image when the shutter speed of camera system 100 is high.

The body shake has a higher frequency, compared to the user's hand shake. Especially, the body shake has a high frequency that causes the phase lag by performing the low-pass filter process to the shake signal in gyro sensor 217.

1-4-2. Shutter Impact

Figure 7:
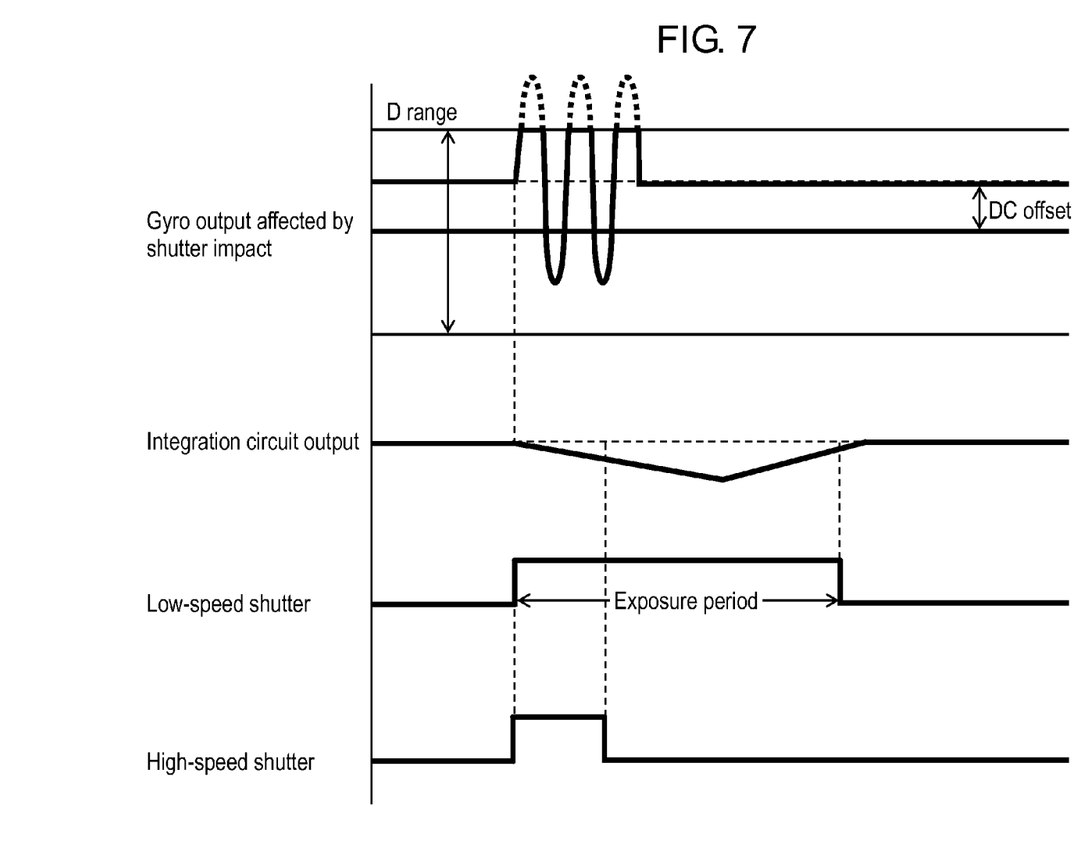
FIG. 7 is a schematic view for describing an influence to be given on the captured image by a shutter impact according to the first embodiment.

Next, the shutter impact is described with reference to FIG. 7. FIG. 7 is a schematic view for describing an influence to be given on the captured image by a shutter impact.

When the user fully depresses release button 318, the operation of the front curtain of mechanical shutter 310 is started. When the front curtain moves to the terminal end of mechanical shutter 310 to collide against the terminal end, the shutter impact is generated. The shutter impact is a vibration caused in camera system 100. It affects the output from gyro sensor 217, but it is not a vibration greatly shaking camera system 100. For example, the output from gyro sensor 217 is affected as indicated by "gyro output affected by shutter impact" in FIG. 7 by the shutter impact. FIG. 7 does not illustrate the component such as the user's hand shake, but only illustrates the influence given by the shutter impact to the output from gyro sensor 217.

The influence caused by the shutter impact to the captured image is described. The output from gyro sensor 217 receiving the shutter impact passes through integration circuit 243, and becomes a signal indicated by "integration circuit output" in FIG. 7. The amplitude of the vibration caused by the shutter impact is significantly larger than the vibration caused by the body shake. Therefore, the amplitude of the vibration caused by the shutter impact might exceed a dynamic range of gyro sensor 217. Gyro sensor 217 mostly has a DC offset. Therefore, one of the upper value and the lower value of the amplitude caused by the shutter impact might exceed the dynamic range. For example, it is supposed that the DC offset deflects upward from the center, so that the upper value of the output from gyro sensor 217 exceeds the dynamic range, as indicated by "gyro output affected by shutter impact" in FIG. 7. In this case, the computation of the integration circuit has to be originally done in consideration of the portion exceeding the dynamic range. However, the signal is saturated, so that it cannot be considered, in actuality. Therefore, as indicated by "integration circuit output" in FIG. 7, the output from integration circuit 243 directs downward after affected by the shutter impact.

When the shutter speed of camera system 100 is set to be low, the output from integration circuit 243 affected by the shutter impact is greatly shifted during the exposure period as illustrated in FIG. 7, whereby the output is affected relatively heavily. On the other hand, when the shutter speed of camera system 100 is set to be high, the output from integration circuit 243 affected by the shutter impact does not change so much during the exposure period. This means that the output is less affected.

1-4-3. Summary of Relationship Between Various Vibrations and Shutter Speed

Figure 8:
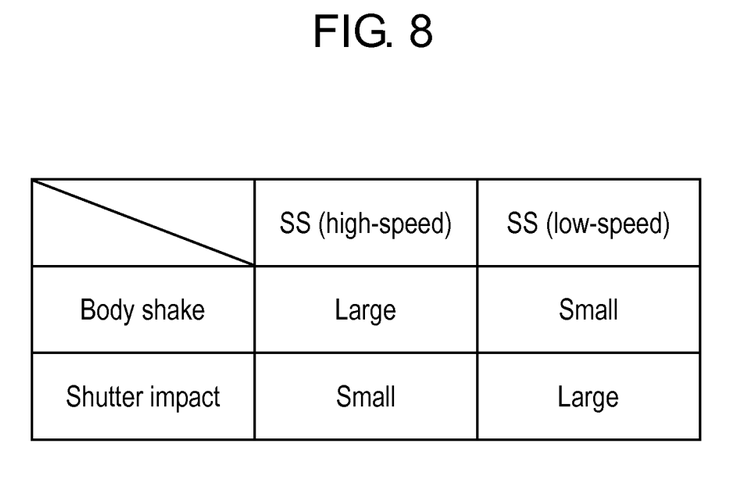
FIG. 8 is a schematic view for describing a relationship between a shutter speed and each shake according to the first embodiment.

The relationship between the body shake as well as the shutter impact, and the shutter speed is summarized with reference to FIG. 8. FIG. 8 is a schematic table for describing the relationship between the body shake as well as the shutter impact, and the shutter speed.

When the shutter speed is high, the body shake affects relatively heavily the captured image, while the captured image is much less affected by the shutter impact. On the other hand, when the shutter speed is low, the captured image is less affected by the body shake, but is relatively heavily affected by the shutter impact.

1-5. Operation

Figure 9:
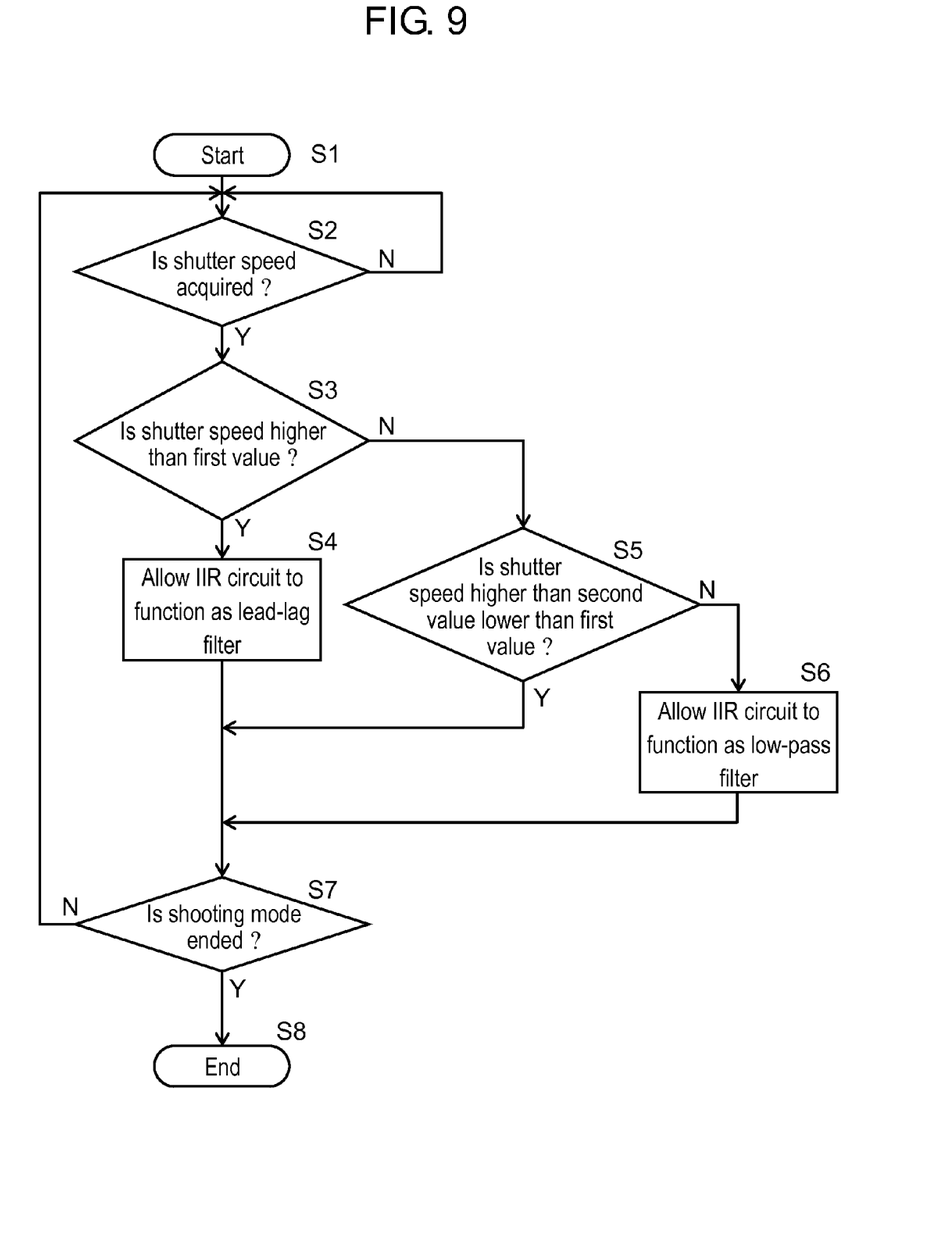
FIG. 9 is a flowchart for describing an operation of an interchangeable lens according to the first embodiment.

The operation of interchangeable lens 200 is described with reference to FIG. 9. FIG. 9 is a flowchart for describing the operation of interchangeable lens 200.

When camera system 100 is set to be a shooting mode, the control of interchangeable lens 200 by lens controller 218 is started (S1). Lens controller 218 acquires information involved with the shutter speed from camera body 300 through lens mount 219 (S2). When acquiring the information involved with the shutter speed, lens controller 218 determines whether the shutter speed set to camera system 100 is faster than a first value (S3). For example, the first value is 1/60 (second).

When determining that the shutter speed is faster than the first value, lens controller 218 allows inside general-purpose IIR circuit 242 to function as the lead-lag filter (S4).

On the other hand, when determining that the shutter speed is lower than the first value, lens controller 218 determines whether the shutter speed is faster than a second value (S5). The second value is lower than the first value. For example, the second value is 1/2 (second).

When determining that the shutter speed is lower than the second value, lens controller 218 allows inside general-purpose IIR circuit 242 to function as the low-pass filter (S6).

When completing the process in step S4, making a positive determination in step S5, or completing the process in step S6, lens controller 218 determines whether the shooting mode is ended or not (S7). When lens controller 218 determines that the shooting mode is ended, the control of interchangeable lens 200 by lens controller 218 is ended (S8).

As described above, interchangeable lens 200 allows general-purpose IIR circuit 242 to function as the lead-lag filter, when the shutter speed of camera system 100 is determined to be faster than the first value. The reason why this configuration is employed is described next.

When the shutter speed is high, the captured image is heavily affected by the body shake as described above. The body shake causes the phase lag due to the low-pass filter process in gyro sensor 217 as described above. Therefore, lens controller 218 allows inside general-purpose IIR circuit 242 to function as the lead-lag filter in order to compensate the phase lag of the body shake for generating a more appropriate shake signal. Camera system 100 controls image stabilizer motor 214 based on the more appropriate shake signal, whereby the influence caused by the body shake to the captured image can be considered. As a result, an image less affected by the body shake can be captured.

Interchangeable lens 200 allows the general-purpose IIR circuit 242 to function as the low-pass filter, when the shutter speed of camera system 100 is determined to be lower than the second value. The reason why this configuration is employed is described next.

When the shutter speed is low, the captured image is heavily affected by the shutter impact as described above. As described above, one of the upper value and the lower value of the amplitude of the vibration caused by the shutter impact might exceed the dynamic range, which adversely affects the output from integration circuit 243. In view of this, lens controller 218 allows inside general-purpose IIR circuit 242 to function as the low-pass filter in order to reduce the influence to be given on the output from gyro sensor 217 by the shutter impact for generating a more appropriate shake signal falling within the dynamic range. Camera system 100 controls image stabilizer motor 214 based on the more appropriate shake signal, whereby an image less affected by the vibration can be captured.

1-6. Effects

As described above, interchangeable lens 200 according to the present embodiment includes gyro sensor 217, lens mount 219, lens controller 218, and image stabilizer motor 214. Gyro sensor 217 detects an angular speed of the camera system, and outputs a shake signal associated with the detected angular speed. Lens mount 219 acquires information indicating a set shutter speed. Lens controller 218 advances a phase of the shake signal to generate an adjusted signal, and outputs the adjusted signal, when the set shutter speed is faster than a predetermined speed. A interchangeable lens including lens controller 218 and image stabilizer motor 214 corrects an influence on the shake of the camera system due to a shake associated with the angular speed, based on the shake signal or the adjusted signal.

Thus, interchangeable lens 200 according to the present embodiment can generate a more appropriate shake signal, and can realize an image stabilization with high precision.

In interchangeable lens 200 according to the present embodiment, the shake signal is a signal that undergoes a process in which the signal generated based on the angular speed detected by gyro sensor 217 passes through the low-pass filter, through which the attenuation amount of the frequency component higher than the predetermined cutoff frequency is larger than the attenuation amount of the frequency component lower than the predetermined cutoff frequency.

Thus, interchangeable lens 200 according to the present embodiment can generate a more appropriate shake signal, and can realize an image stabilization with high precision.

Interchangeable lens 200 according to the present embodiment is an interchangeable lens detachable from camera body 300 to which an interchangeable lens can be attached. Interchangeable lens 200 includes gyro sensor 217, lens mount 219, general-purpose IIR circuit 242 included in lens controller 218, image stabilizer lens 213, and lens controller 218. Gyro sensor 217 detects an angular speed, and outputs a shake signal associated with the detected angular speed. Lens mount 219 acquires information indicating a set shutter speed from the camera body. General-purpose IIR circuit 242 advances a phase of the shake signal to generate an adjusted signal, and outputs the adjusted signal, when the set shutter speed is faster than a predetermined speed. The image stabilizer lens 213 can move in the plane perpendicular to the optical axis of interchangeable lens 200. Lens controller 218 controls image stabilizer motor 214 so as to correct the influence on the output of interchangeable lens 200 due to the shake associated with the angular speed, based on the shake signal or the adjusted signal.

Thus, interchangeable lens 200 according to the present embodiment can generate a more appropriate shake signal, and can realize an image stabilization with high precision.

Camera system 100 according to the present embodiment includes camera body 300 to which an interchangeable lens can be attached, and interchangeable lens 200 detachable from camera body 300. Camera body 300 includes body mount 319, mechanical shutter 310, and body controller 314. Body mount 319 communicates with interchangeable lens 200. Mechanical shutter 310 includes a frame having an opening, and curtain, which is held by the frame, and moves respectively in a direction of opening the opening and in a direction of closing the opening. Body controller 314 sets the shutter speed of mechanical shutter 310. Interchangeable lens 200 includes lens mount 219, gyro sensor 217, general-purpose IIR circuit 242 included in lens controller 218, image stabilizer lens 213, and lens mount 219. Lens mount 219 communicates with camera body 300 through body mount 319, and acquires the information indicating the shutter speed set to camera body 300. Gyro sensor 217 detects an angular speed, and outputs a shake signal associated with the detected angular speed. General-purpose IIR circuit 242 advances a phase of the shake signal to generate an adjusted signal, and outputs the adjusted signal, when the set shutter speed is faster than a predetermined speed. The image stabilizer lens 213 can move in the plane perpendicular to the optical axis of interchangeable lens 200. Lens controller 218 controls image stabilizer motor 214 so as to correct the influence on the output of interchangeable lens 200 due to the shake associated with the angular speed, based on the shake signal or the adjusted signal.

Thus, camera system 100 according to the present embodiment can generate a more appropriate shake signal, and can realize an image stabilization with high precision.

Other Embodiments

As presented above, the first embodiment has been described as an example of the technology according to the present disclosure. However, the technology in the present disclosure is not limited thereto, and is applicable to embodiments in which various modifications, replacements, additions, and omissions are made.

The other embodiments are described below.

In the first embodiment, the technology in the present disclosure is applied to an interchangeable lens. However, the disclosure is not limited thereto. The technology in the present disclosure can be applied to a digital camera with built-in lens.

In the first embodiment, the image stabilization is realized by driving image stabilizer lens 213. However, the technology is not limited thereto. For example, camera system 100 may realize the image stabilization by moving image sensor 311 in the plane perpendicular to the optical axis of interchangeable lens 200 based on the generated shake signal, or may realize the image stabilization by an electronic system of controlling the trimming position of the image generated by image sensor 311.

In the first embodiment, when the shutter speed is set between the first value and the second value, general-purpose IIR circuit 242 is used neither as the lead-lag filter nor as the low-pass filter, as illustrated in FIG. 9. However, the technology is not limited thereto. For example, in this case, general-purpose IIR circuit 242 can be used as the lead-lag filter that generates the phase lead in an amount smaller than that by the lead-lag filter applied when the shutter speed is set as the value higher than the first value. In this case, general-purpose IIR circuit 242 may be used as the low-pass filter that attenuates the signal with the frequency higher than that of the low-pass filter applied when the shutter speed is set as the value lower than the second value. The configuration may be applied in which, when the shutter speed is faster than a predetermined value, general-purpose IIR circuit 242 is used as the lead-lag filter, while general-purpose IIR circuit 242 is used as the low-pass filter when the shutter speed is lower than the predetermined value.

Figure 10:
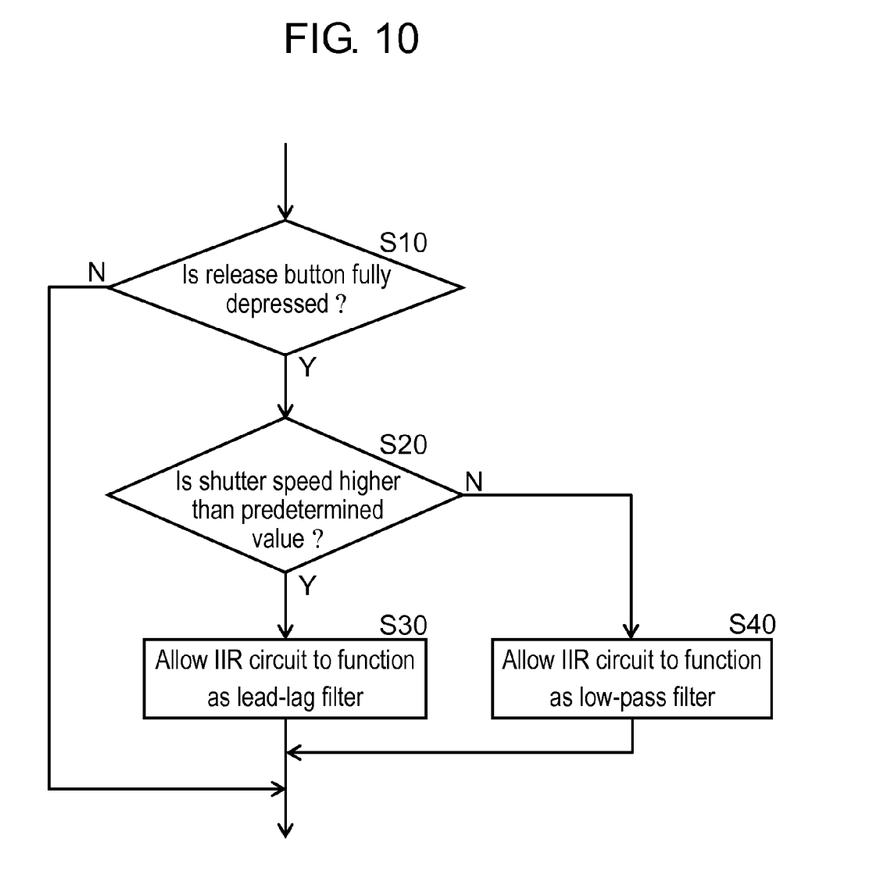
FIG. 10 is a flowchart for describing an operation of a digital camera according to another embodiment.

Specifically, camera system 100 may operate according to a flowchart in FIG. 10. FIG. 10 is a flowchart for describing the operation of a digital camera according to another embodiment. This interchangeable lens determines whether a release button is fully depressed by a user (S10). When determining that the release button is fully depressed, the interchangeable lens determines whether or not the shutter speed is faster than a predetermined value (S20). When determining that the shutter speed is faster than the predetermined value, the digital camera allows the general-purpose IIR circuit to function as the lead-lag filter (S30). On the other hand, when determining that the shutter speed is lower than the predetermined value, the digital camera allows the general-purpose IIR circuit to function as the low-pass filter (S40).

In the first embodiment, when the shutter speed is lower than the second value, the camera system allows general-purpose IIR circuit 242 to function as the low-pass filter as illustrated in FIG. 9. However, the technology is not limited thereto. For example, when the shutter speed is lower than the second value, the camera system may not allow general-purpose IIR circuit 242 to function. Specifically, the camera system is only configured to allow general-purpose IIR circuit 242 to function as the lead-lag filter when the shutter speed is faster than the predetermined value.

In the first embodiment, mechanical shutter 310 has the front curtain and the rear curtain. However, the technology is not limited thereto. For example, mechanical shutter 310 may include only either one of the front curtain and the rear curtain, and the other one may be realized by an electronic shutter.

As presented above, the embodiments have been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

The disclosure herein is applicable to a camera system with interchangeable lens, a digital still camera, a digital video camera, a camera phone, and smartphone.

What is claimed is:

1. An image stabilizer device for a camera system comprising:
    a detection unit configured to detect an angular speed of the camera system and output a shake signal associated with the detected angular speed;
    an acquiring unit configured to acquire information indicating a set shutter speed of the camera system;
    an adjusting unit configured to advance a phase of the shake signal to generate an adjusted signal, and to output the adjusted signal, when the set shutter speed is faster than a predetermined speed; and
    a correction unit configured to correct an influence on an output of the image stabilizer device due to a shake associated with the angular speed, based on the shake signal or the adjusted signal.

2. The image stabilizer device according to claim 1, wherein the shake signal is a signal undergoing a process of allowing a signal, generated based on the angular speed detected by the detection unit, to pass through a low-pass filter through which an attenuation amount of a frequency component higher than a predetermined cutoff frequency becomes larger than an attenuation amount of a frequency component lower than the predetermined cutoff frequency.

3. An interchangeable lens detachable from a camera body to which an interchangeable lens is attached, the interchangeable lens comprising:
    a gyro sensor configured to detect an angular speed of the interchangeable lens and output a shake signal associated with the detected angular speed;
    a lens mount configured to acquire information indicating a set shutter speed from the camera body;
    a filter configured to advance a phase of the shake signal to generate an adjusted signal, and to output the adjusted signal, when the set shutter speed is faster than a predetermined speed;
    a correction lens movable in a plane perpendicular to an optical axis of the interchangeable lens; and
    a lens controller configured to correct an influence on an output of the interchangeable lens due to a shake associated with the angular speed, based on the shake signal or the adjusted signal.

4. The interchangeable lens according to claim 3, wherein the shake signal is a signal having undergone a process of allowing a signal, generated based on the angular speed detected by the gyro sensor, to pass through a low-pass filter through which an attenuation amount of a frequency component higher than a predetermined cutoff frequency becomes larger than an attenuation amount of a frequency component lower than the predetermined cutoff frequency.

5. A camera system comprising:
    a camera body to which an interchangeable lens is attached; and
    an interchangeable lens detachable from the camera body, wherein
    the camera body including:
    a body mount configured to communicate with the interchangeable lens;
    a shutter configured to include a frame having an opening, and a curtain held by the frame, the curtain moving in a direction of opening the opening and in a direction of closing the opening; and
    a setting unit configured to set a shutter speed of the shutter, and
    the interchangeable lens includes:
    a lens mount configured to communicate with the camera body through the body mount, and to acquire information indicating a shutter speed set to the camera body;
    a gyro sensor configured to detect an angular speed of the interchangeable lens and output a shake signal associated with the detected angular speed;
    a filter configured to advance a phase of the shake signal to generate an adjusted signal, and to output the adjusted signal, when the set shutter speed is faster than a predetermined speed;
    a correction lens movable in a plane perpendicular to an optical axis of the interchangeable lens; and
    a lens controller configured to correct an influence on an output of the interchangeable lens due to a shake associated with the angular speed, based on the shake signal or the adjusted signal.

* * * * *